(12) United States Patent
Wang

(10) Patent No.: US 8,025,995 B2
(45) Date of Patent: Sep. 27, 2011

(54) BATTERY FASTENING ASSEMBLY

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 417 days.

(21) Appl. No.: 12/417,822

(22) Filed: Apr. 3, 2009

(65) Prior Publication Data
US 2010/0112422 A1    May 6, 2010

(30) Foreign Application Priority Data
Oct. 31, 2008  (CN) .......................... 2008 1 0305352

(51) Int. Cl.
*H01M 2/10* (2006.01)
(52) U.S. Cl. .......................................... 429/97; 429/96
(58) Field of Classification Search .......... 429/121–347; 320/107–115
See application file for complete search history.

(56) References Cited

U.S. PATENT DOCUMENTS
5,722,705 A * 3/1998 Deguchi .......................... 292/87

FOREIGN PATENT DOCUMENTS
CN    1681144 A    10/2005
CN    1937893 A  *  3/2007

OTHER PUBLICATIONS
Xu H. CN 1937893 A. Mar. 2007. Derwent Abstract.*
* cited by examiner Primary Examiner — Basia Ridley
Assistant Examiner — James Lee
(74) Attorney, Agent, or Firm — Altis Law Group, Inc.

(57) ABSTRACT

A battery fastening assembly for fastening a battery to a housing, includes a receiving portion formed on the housing and a fastening subassembly. The receiving portion defines a receiving slot and a first engaging portion. The battery defines a second engaging portion. At least part of the fastening subassembly is slidable between the battery and the housing to engage with the receiving slot and the second engaging portion or the first engaging portion and the second engaging portion.

14 Claims, 6 Drawing Sheets

BATTERY FASTENING ASSEMBLY

BACKGROUND

1. Technical Field

The present disclosure generally relates to battery fastening assemblies and, particularly, to a battery fastening assembly for fastening a battery to a housing of an electronic device.

2. Description of the Related Art

Many portable electronic devices, such as notebook computers and portable disk players, usually have batteries to drive the electronic devices. The batteries are mounted to the electronic devices by battery fastening assemblies.

A typical battery fastening assembly usually includes an elastic latching portion formed on a housing of an electronic device and a slot defined in a battery. When assembling the battery to or disassembling the battery from the housing, the elastic latching portion is forced to deform, thus engaging with or disengaging from the slot of the battery. However, the elastic latching portion can be easily damaged.

Therefore, a new battery fastening assembly is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
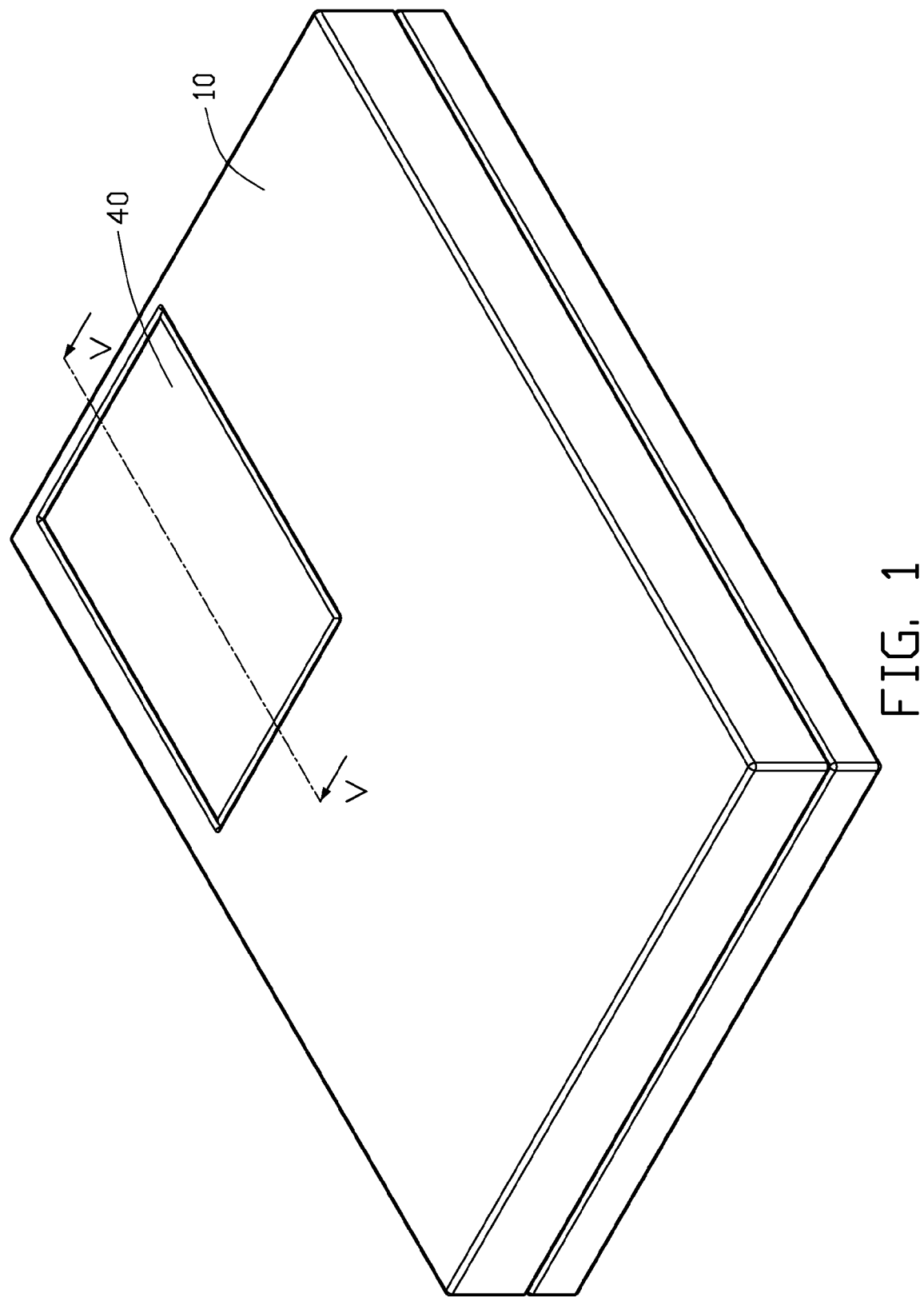
FIG. 1 is an assembled, isometric view of an electronic device employed with one embodiment of a battery fastening assembly.
Figure 2:
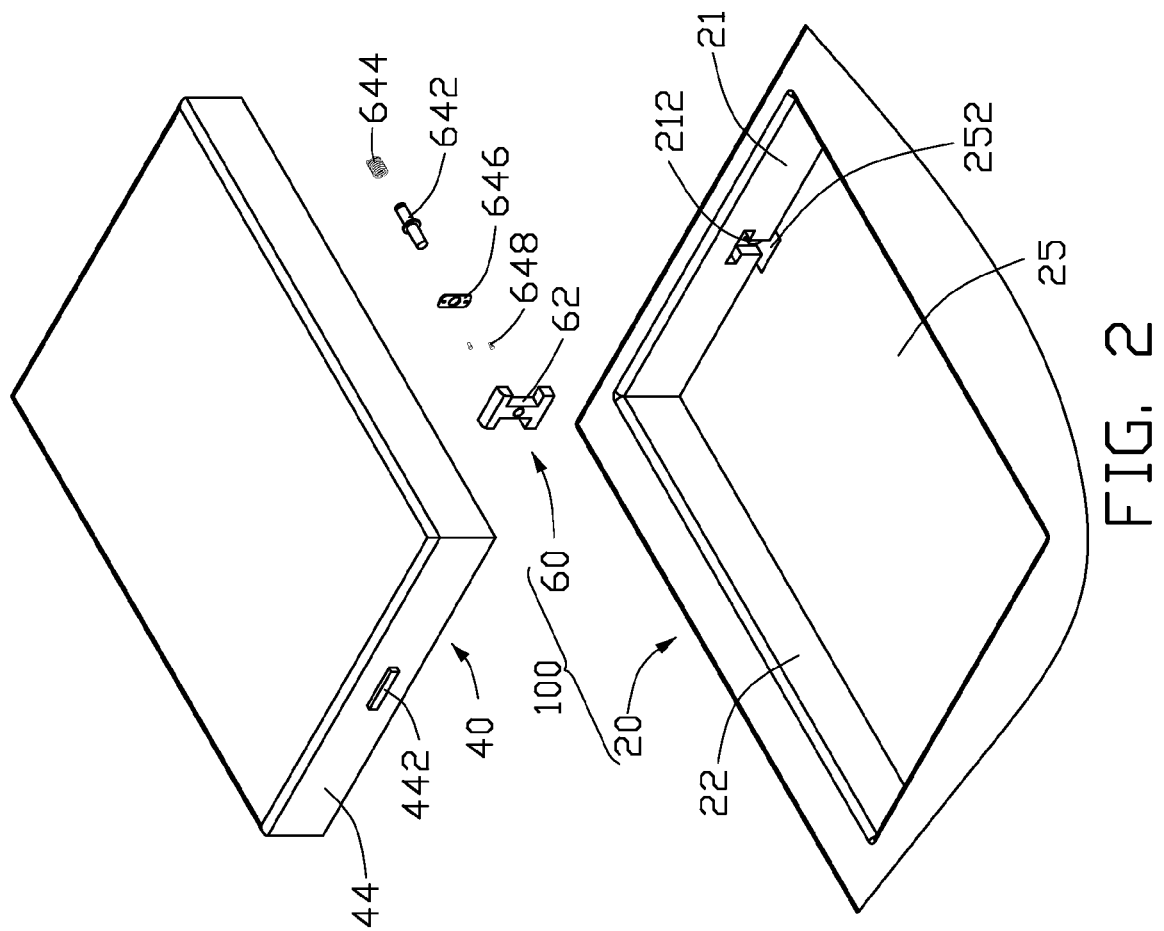
FIG. 2 is an exploded, isometric view of the electronic device of FIG. 1.
Figure 3:
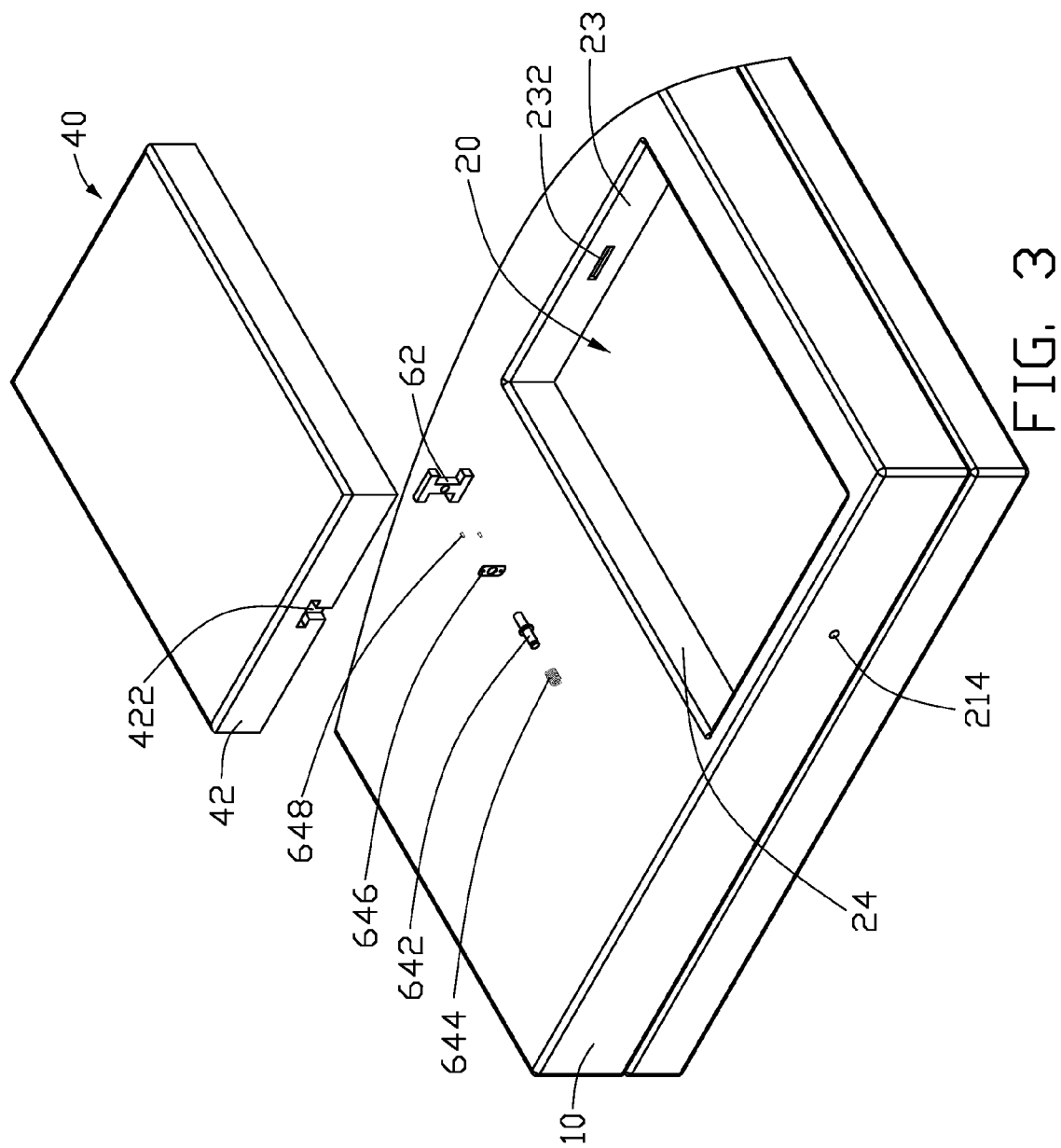
FIG. 3 is similar to FIG. 2, but viewed from another aspect.

Referring to FIGS. 1-3, one embodiment of a battery fastening assembly 100 includes a receiving portion 20 formed on a housing 10 and a fastening subassembly 60 to hold a battery 40 in the receiving portion 20. The housing 10 may be a notebook or a portable disk player, and so on. In the illustrated embodiment, a notebook is detailed.

The receiving portion 20 includes a first sidewall 21, a second sidewall 22, a third sidewall 23 opposite the first sidewall 21, a fourth sidewall 24 opposite the second sidewall 22, and a bottom wall 25. The first, second, third, fourth sidewalls 21, 22, 23, 24 extend substantially perpendicularly from the bottom wall 25, thereby forming a rectangular space. The first sidewall 21 defines a T-shape receiving slot 212 and a through hole 214 extending through the first sidewall 21 and communicating with the receiving slot 212. The bottom wall 25 defines a first engaging slot 252 communicating with the receiving slot 212 and positioned opposite to the head portion of the T-shape receiving slot 212. The first engaging slot 252 includes a front portion and a rear portion directly below the receiving slot 212. The third sidewall 23 defines a fixing slot 232.

The battery 40 includes a first side surface 42 and a second side surface 44 opposite to the first side surface 42. The battery 40 defines a second engaging slot 422 in the first side surface 42. A fixing protrusion 442 is formed on the second side surface 44, to engage in the fixing slot 232 of the housing 10.

Figure 4:
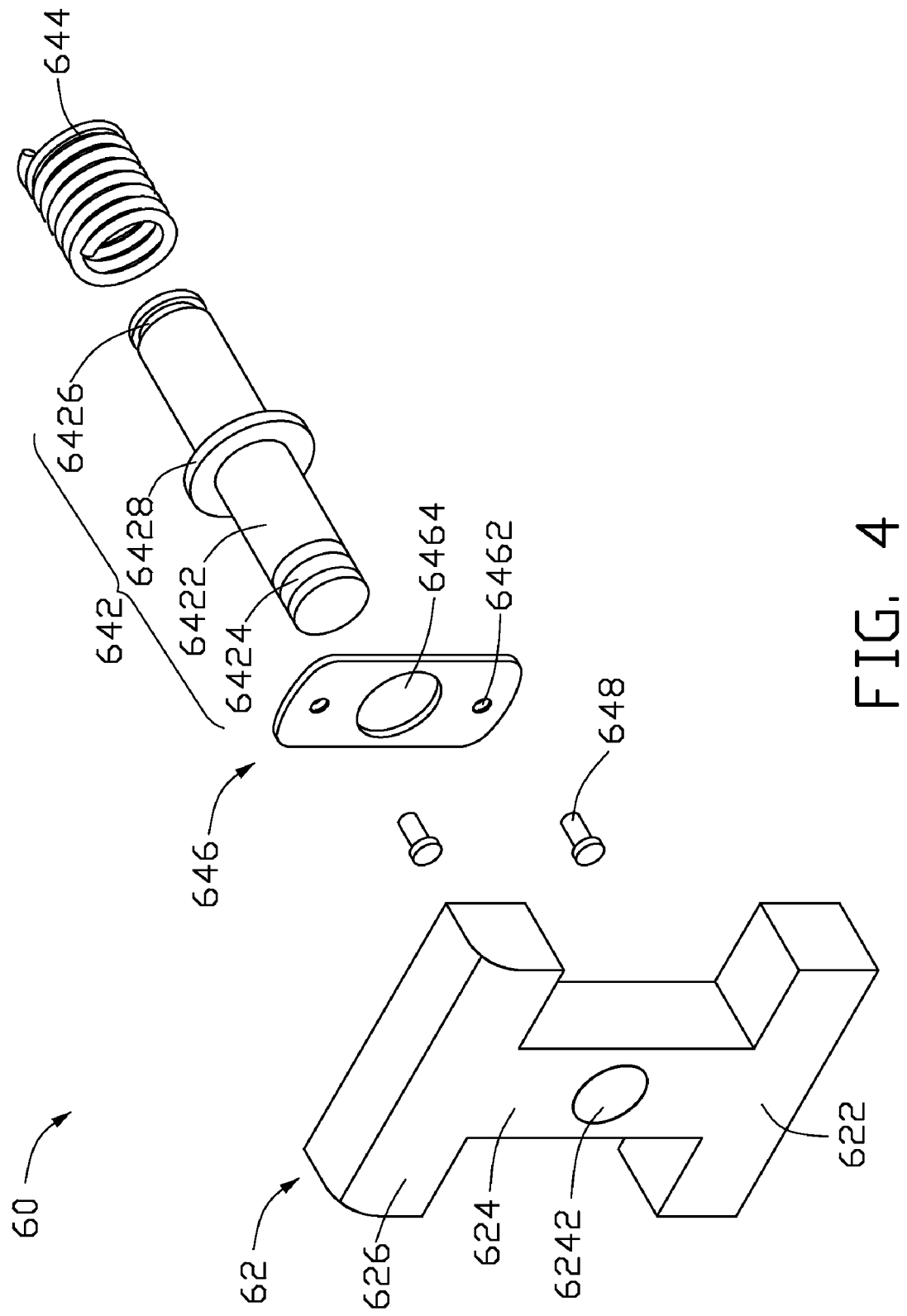
FIG. 4 is an exploded view of the battery fastening assembly.
Figure 5:
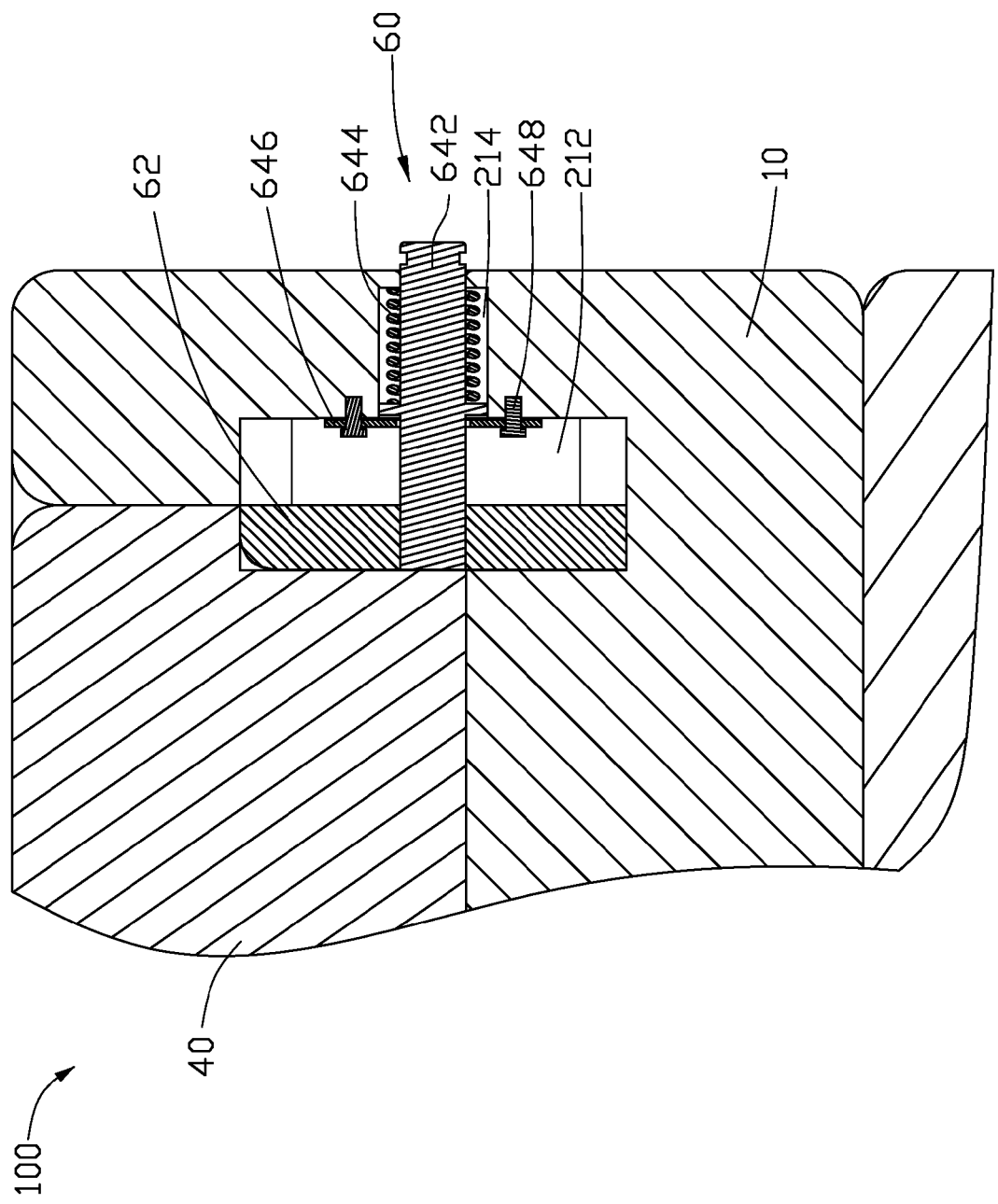
FIG. 5 is a partial, cross-sectional view of the electronic device, taken along line V-V of FIG. 1.
Figure 6:
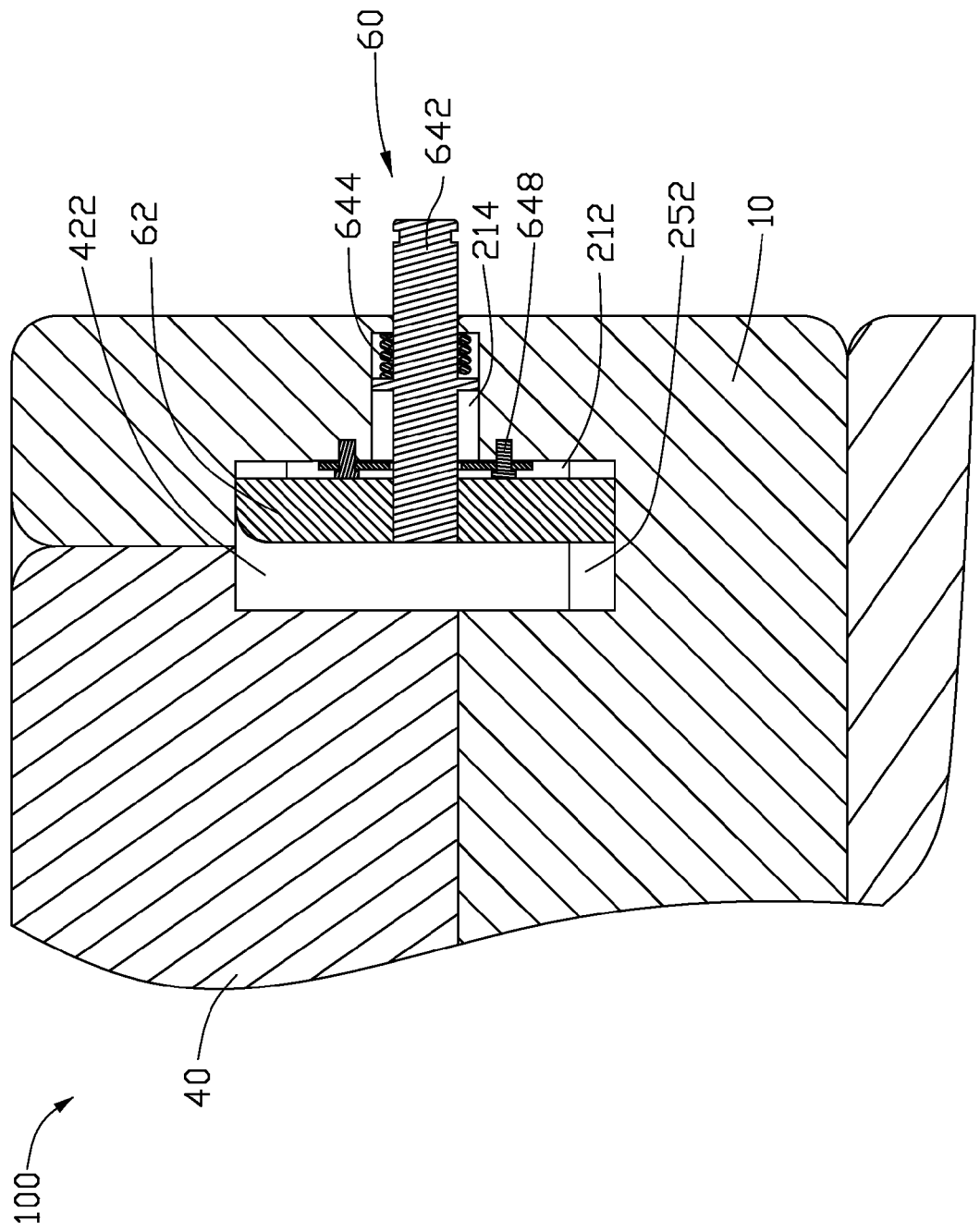
FIG. 6 is similar to FIG. 5, but shown in another state.

Referring also to FIG. 4, the fastening subassembly 60 includes a catching member 62, a pole 642, an elastic member 644, and a blocking plate 646. An end of the pole 642 is fixed to the catching member 62, and the elastic member 644 and the blocking plate 646 are sleeved on the pole 642.

The catching member 62 includes a first catching portion 622, a second catching portion 626, and a connecting portion 624 substantially perpendicularly connected between the first and second catching portions 622, 626. The connecting portion 624 defines a threaded hole 6242. The pole 642 includes a main portion 6422, a threaded portion 6424, and a pulling portion 6426. The threaded portion 6424 and the pulling portion 6426 are formed at opposite ends of the main portion 6422. The screw thread portion 6424 engages in the threaded hole 6242 to fix the pole 642 to the catching member 62. A flange 6428 is formed on a middle portion of the main portion 6422. In the illustrated embodiment, the elastic member 644 is a compression spring. The blocking plate 646 defines a shaft hole 6464 and two fixing holes 6462. The fixing holes 6462 are to receive corresponding bolts 648 to engage with the first sidewall 21, thus fixing the blocking plate 646 to the first sidewall 21.

In assembling the battery fastening assembly 100, the blocking plate 646 and the catching member 62 are sleeved on the main portion 6422 from the threaded portion 6424 end of the pole 642. The elastic member 644 is sleeved on the main portion 6422 from the pulling portion 6426 end of the pole 642. The pulling portion 6426 of the pole 642 extends through the through hole 214 and out of the housing 10, and the catching member 62 is received in the receiving portion 20. The blocking plate 646 is fixed on the first sidewall 21.

Referring to FIGS. 2 through 6, when the battery 10 needs to be assembled to the housing 10, the pole 642 is pulled outwards to slide the catching member 62 into the receiving slot 212 and a rear portion of the first engaging slot 252, thereby compressing the elastic member 622. While the fixing protrusion 442 of the battery 40 is engaged in the fixing slot 232 of the housing 10, the battery 40 can be placed into the receiving portion 20 of the housing 10. When the pole 642 is released, the catching member 62 slides into the front portion of the first engaging slot 252 and the second engaging slot 422 by an elastic force of the elastic member 644. The first catching portion 622 engages in the front portion of the first engaging slot 252 and the second catching portion 626 engages in the second engaging slot 422. Thus, the battery 40 is positioned in the receiving portion 20 of the housing 10. The elastic member 644 is compressed, thus ensuring the battery 40 can be firmly fastened on the housing 10.

When the battery 40 needs to be disassembled from the housing 10, the pole 642 is pulled outwards to slide the catching member 62 out from the rear portion of the first engaging slot 252 and the second engaging slot 422 and into the receiving slot 212 and the front portion of the first engaging slot 252. The end adjacent to the first surface 42 of the battery 40 may then be pulled upwards, and the battery 40 may be disassembled from the housing 10.

Since the battery 40 can be fastened to or detached from the housing 10 by simply pulling the pole 642, it is quite convenient to assemble or disassemble the battery 40. In addition, while pulling the pole 642 to fasten or detach the battery 40, the components of the battery fastening assembly 100 are not easily damaged. Therefore, the battery fastening assembly 100 has a long service life.

It can be understood that the fixing protrusion 442 may be formed on other side surfaces of the battery 40, except the first side surface 42. The first engaging slot 252 may be defined in the first sidewall 21. The fixing slot 232 may be defined in the battery 40 and the fixing protrusion 442 may be formed on the housing 10. Also, the fixing slot 232 may be replaced by a hook engaged with the fixing protrusion 442. That is, the fixing slot 232 and the fixing protrusion 442 may be replaced by other fixing mechanisms. The elastic member 644 may also be an extension spring. In this case, the elastic member 644 should be disposed between the blocking plate 646 and the flange 6428. The first and second engaging slots 252, 422 may be other engaging portions for engaging with the catching member 62. For example, each of the engaging portions includes two protrusions, and the catching member 62 is caught between the protrusions.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A battery fastening assembly for fastening a battery to a housing, the battery fastening assembly comprising:
   a receiving portion formed on the housing, the receiving portion defining a receiving slot and a first engaging portion; and
   a fastening subassembly, wherein the fastening subassembly comprises a catching member, a pole, an elastic member, and a blocking plate; an end of the pole is fixed to the catching member; the elastic member and the blocking plate are sleeved on the pole;
   the catching member includes a first catching portion, a second catching portion, and a connecting portion connected between the first and second catching portions; the connecting portion defines a threaded hole;
   the pole comprises a main portion, a threaded portion, and a pulling portion, the threaded portion and the pulling portion are formed at opposite ends of the main portion; the threaded portion engages in the threaded hole; a flange is formed on a middle portion of the main portion;
   wherein the battery defines a second engaging portion; at least part of the fastening subassembly is slidable between the battery and the housing, to engage with the receiving slot and the second engaging portion or the first engaging portion and the second engaging portion.

2. The battery fastening assembly of claim 1, wherein the receiving portion defines a fixing portion; the battery forms a second fixing portion for engaging in the fixing portion of the receiving portion.

3. The battery fastening assembly of claim 2, wherein the fixing portion of the receiving portion is a fixing slot; the fixing portion of the battery is a fixing protrusion.

4. The battery fastening assembly of claim 2, wherein the receiving portion comprises a first sidewall, a second sidewall, a third sidewall opposite the first sidewall, a fourth sidewall opposite the second sidewall, and a bottom wall; the first, second, third, and fourth sidewalls extend substantially perpendicularly from the bottom wall, thereby forming a rectangular space; the receiving slot is defined in the first sidewall and the fixing portion is defined in the third sidewall.

5. The battery fastening assembly of claim 4, wherein the second engaging portion and the fixing portion of the battery are formed on opposite sides of the battery.

6. The battery fastening assembly of claim 1, wherein the elastic member is a compression spring, and disposed between the flange and the housing.

7. The battery fastening assembly of claim 1, wherein the catching member can be slid into a rear portion of the first engaging slot and the second engaging slot or the receiving slot and a front portion of the first engaging slot.

8. A battery fastening assembly for fastening a battery to a housing, the battery fastening assembly comprising:
   a receiving portion formed on the housing, wherein the battery is received in the receiving portion; and
   a fastening subassembly comprising a catching member, an elastic member, a pole and a blocking plate; an end of the pole is fixed to the catching member; the elastic member and the blocking plate are sleeved on the pole;
   the catching member includes a first catching portion, a second catching portion, and a connecting portion connected between the first and second catching portions; the connecting portion defines a threaded hole;
   the pole comprises a main portion, a threaded portion, and a pulling portion, the threaded portion and the pulling portion are formed at opposite ends of the main portion; the threaded portion engages in the threaded hole; a flange is formed on a middle portion of the main portion;
   wherein the fastening subassembly is slidable relative to the housing to cause the catching member to engage or disengage with the battery; the elastic member provides a force to urge the catching member to engage with the battery.

9. The battery fastening assembly of claim 8, wherein the receiving portion defines a fixing portion, a receiving slot, and a first engaging portion; the battery forms a second fixing portion to engage in the fixing portion of the receiving portion and a second engaging portion.

10. The battery fastening assembly of claim 9, wherein the fixing portion of the receiving portion is a fixing slot; the fixing portion of the battery is a fixing protrusion.

11. The battery fastening assembly of claim 9, wherein the receiving portion comprises a first sidewall, a second sidewall, a third sidewall opposite the first sidewall, a fourth sidewall opposite the second sidewall, and a bottom wall; the first, second, third, and fourth sidewalls extend substantially perpendicularly from the bottom wall, thereby forming a rectangular space; the receiving slot is defined in the first sidewall and the fixing portion is defined in the third sidewall.

12. The battery fastening assembly of claim 11, wherein the second engaging portion and the fixing portion of the battery are formed on opposite sides of the battery.

13. The battery fastening assembly of claim 8, wherein the elastic member is a compression spring, and disposed between the flange and the housing.

14. The battery fastening assembly of claim 8, wherein the catching member can be slid into a rear portion of the first engaging slot and the second engaging slot or the receiving slot and a front portion of the first engaging slot.

* * * * *